United States Patent
Frantz et al.

(10) Patent No.: US 11,269,887 B2
(45) Date of Patent: Mar. 8, 2022

(54) MAINTAINING CARDINALITY OF ROWS WHILE JOINING WORKSHEETS FROM A DATABASE

(71) Applicant: SIGMA COMPUTING, INC., San Francisco, CA (US)

(72) Inventors: Jason D. Frantz, San Francisco, CA (US); Max H. Seiden, San Francisco, CA (US); James L. Gale, San Francisco, CA (US); Kenneth Truong, Temple City, CA (US)

(73) Assignee: SIGMA COMPUTING, INC., San Francisco, CA (US)

(*) Notice: Subject to any disclaimer, the term of this patent is extended or adjusted under 35 U.S.C. 154(b) by 124 days.

(21) Appl. No.: 16/862,953

(22) Filed: Apr. 30, 2020

(65) Prior Publication Data

US 2020/0349153 A1 Nov. 5, 2020

Related U.S. Application Data

(60) Provisional application No. 62/841,615, filed on May 1, 2019.

(51) Int. Cl.
*G06F 15/16* (2006.01)
*G06F 16/2455* (2019.01)
*G06F 16/23* (2019.01)

(52) U.S. Cl.
CPC ...... *G06F 16/2456* (2019.01); *G06F 16/2365* (2019.01)

(58) Field of Classification Search
None
See application file for complete search history.

(56) References Cited

U.S. PATENT DOCUMENTS

2009/0276692 A1* 11/2009 Rosner ............ G06F 40/177
715/227
2014/0013218 A1* 1/2014 Lu ................. G06F 40/174
715/255

OTHER PUBLICATIONS

International Search Report and Written Opinion, PCT/US2020/030738, dated Aug. 11, 2020, 10 pages.
OfficeNewb.com: "Create an Excel PivotTable Based on Multiple Worksheets", Oct. 26, 2016 (Oct. 26, 2016), p. 1, XP054980737, Retrieved from the Internet: URL: https://www.youtube.com/watch?v=r0wQ3DmDOvU, [retrieved on Jul. 31, 2020], 01:00-01:05 min.

* cited by examiner

*Primary Examiner* — Alex Gofman

(57) ABSTRACT

Maintaining cardinality of rows while joining worksheets from a database including receiving a request to join, to a first worksheet, a second worksheet from the database; for each row in the first worksheet: generating a join row for data from the second worksheet on the database; in response to determining that there is at least one matching row in the second worksheet on the database: compare a maximum value and a minimum value for each column in each row of the at least one matching row; if the maximum value and the minimum value match, store a matching value in a corresponding column of the join row; and if the maximum value and the minimum value do not match, store a multiple value indication in the corresponding column of the join row; and presenting the join row adjacent to a corresponding row in the first worksheet.

14 Claims, 6 Drawing Sheets

MAINTAINING CARDINALITY OF ROWS WHILE JOINING WORKSHEETS FROM A DATABASE

CROSS-REFERENCE TO RELATED APPLICATIONS

This application is a non-provisional application for patent entitled to a filing date and claiming the benefit of earlier-filed U.S. Provisional Patent Application Ser. No. 62/841,615, filed May 1, 2019.

BACKGROUND

Field of the Invention

The field of the invention is data processing, or, more specifically, methods, apparatus, and products for maintaining cardinality of rows while joining worksheets from a database.

Description of Related Art

Modern businesses may store large amounts of data in remote databases within cloud-based data warehouses. This data may be accessed using database query languages, such as structured query language (SQL). Few users, however, are able to fully utilize all information stored in the database. Further, manipulating the data stored in the database may require constructing complex queries beyond the abilities of most users.

SUMMARY

Methods, systems, and apparatus for maintaining cardinality of rows while joining worksheets from a database. Maintaining cardinality of rows while joining worksheets from a database includes receiving a request to join, to a first worksheet, a second worksheet from the database; for each row in the first worksheet: generating a join row for data from the second worksheet on the database; in response to determining that there is at least one matching row in the second worksheet on the database: compare a maximum value and a minimum value for each column in each row of the at least one matching row; if the maximum value and the minimum value match, store a matching value in a corresponding column of the join row; and if the maximum value and the minimum value do not match, store a multiple value indication in the corresponding column of the join row; and presenting the join row adjacent to a corresponding row in the first worksheet.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
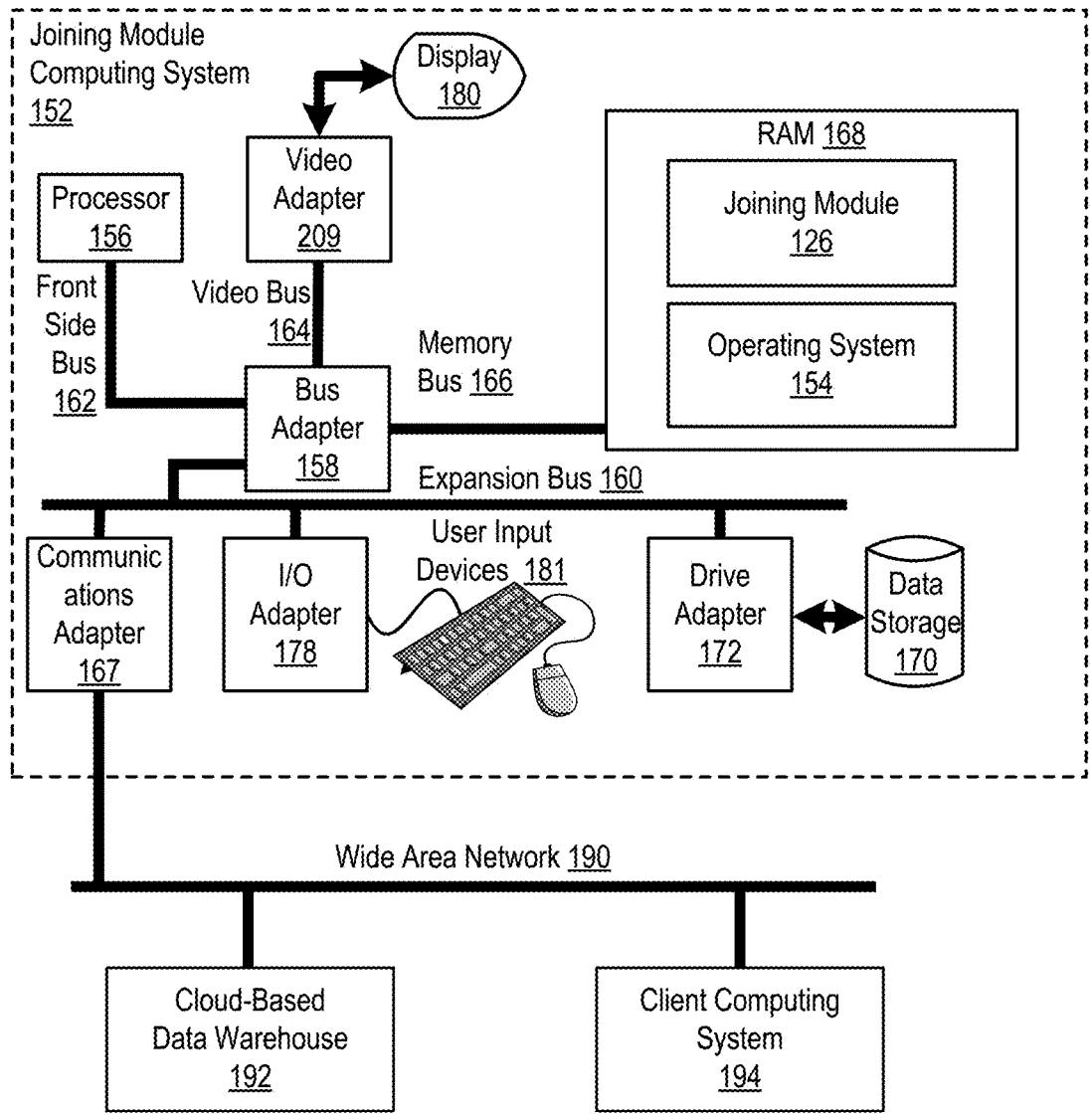
FIG. 1 sets forth a block diagram of an example system configured for maintaining cardinality of rows while joining worksheets from a database according to embodiments of the present invention.

Exemplary methods, apparatus, and products for maintaining cardinality of rows while joining worksheets from a database in accordance with the present invention are described with reference to the accompanying drawings, beginning with FIG. 1. FIG. 1 sets forth a block diagram of automated computing machinery comprising an exemplary joining module computing system (152) configured for maintaining cardinality of rows while joining worksheets from a database according to embodiments of the present invention. The joining module computing system (152) of FIG. 1 includes at least one computer processor (156) or 'CPU' as well as random access memory (168) (RAM') which is connected through a high speed memory bus (166) and bus adapter (158) to processor (156) and to other components of the joining module computing system (152).

Stored in RAM (168) is an operating system (154). Operating systems useful in computers configured for maintaining cardinality of rows while joining worksheets from a database according to embodiments of the present invention include UNIX™, Linux™, Microsoft Windows™, AIX™, IBM's i OS™, and others as will occur to those of skill in the art. The operating system (154) in the example of FIG. 1 is shown in RAM (168), but many components of such software typically are stored in non-volatile memory also, such as, for example, on data storage (170), such as a disk drive. Also stored in RAM is the joining module (126), a module for maintaining cardinality of rows while joining worksheets from a database according to embodiments of the present invention.

The joining module computing system (152) of FIG. 1 includes disk drive adapter (172) coupled through expansion bus (160) and bus adapter (158) to processor (156) and other components of the joining module computing system (152). Disk drive adapter (172) connects non-volatile data storage to the joining module computing system (152) in the form of data storage (170). Disk drive adapters useful in computers configured for maintaining cardinality of rows while joining worksheets from a database according to embodiments of the present invention include Integrated Drive Electronics ('IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example joining module computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example joining module computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary joining module computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for maintaining cardinality of rows while joining worksheets from a database according to embodiments of the present invention include modems for wired dial-up communications, Ethernet (IEEE 802.3) adapters for wired data communications, and 802.11 adapters for wireless data communications.

The communications adapter (167) is communicatively coupled to a wide area network (190) that also includes a cloud-based data warehouse (192) and a client system (194). The cloud-based data warehouse (192) is a computing system or group of computing systems that hosts a database for access over the wide area network (190). The client system (194) is a computing system that accesses the database using the joining module (126) on the joining module computing system (152).

Figure 2:
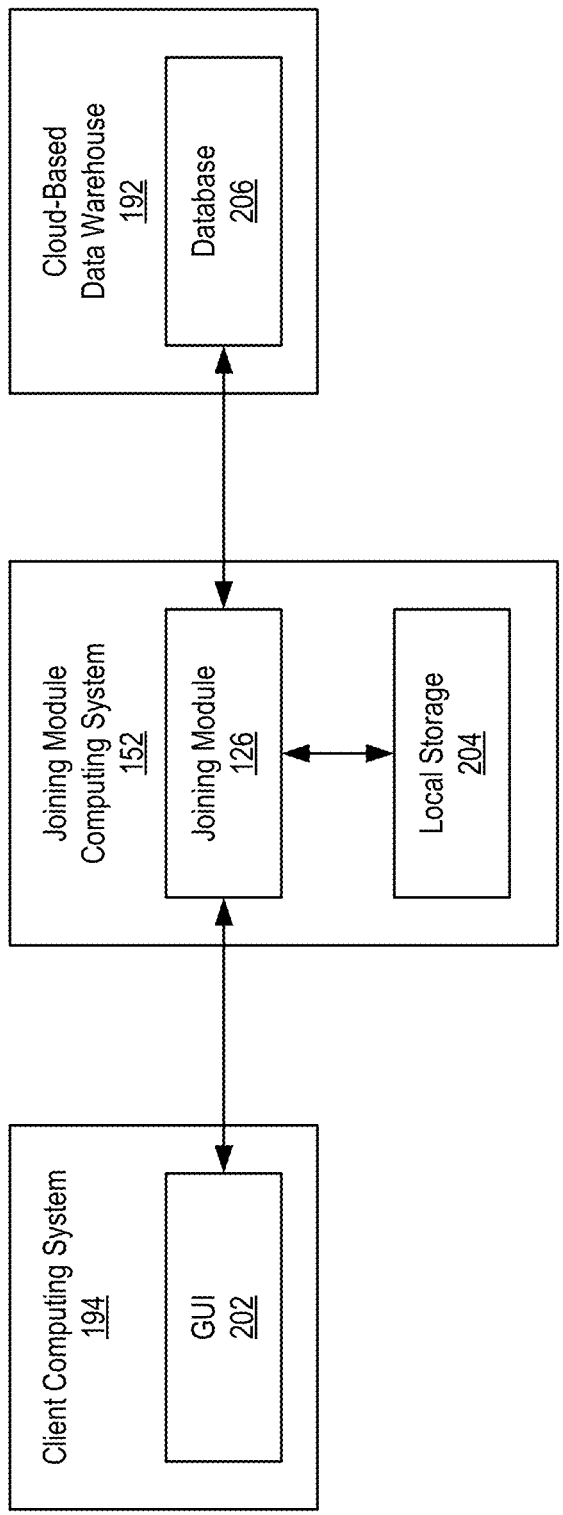
FIG. 2 sets forth a block diagram of an example system configured for maintaining cardinality of rows while joining worksheets from a database according to embodiments of the present invention.

FIG. 2 shows an exemplary block diagram of a system for maintaining cardinality of rows while joining worksheets from a database according to embodiments of the present invention. As shown in FIG. 2, the system includes a client computing system (194), a joining module computing system (152), and a cloud-based data warehouse. The client computing system (194) includes a graphical user interface (GUI) (202). The joining module computing system (152) includes a joining module (126) and local storage (204). The cloud-based data warehouse (192) includes a database (206).

The GUI (202) is a user interface that presents a data set and graphical elements to a user and receives user input from the user. The GUI (202) may be presented, in part, by the joining module (126) and displayed on a client computing system (194) (e.g., on a system display or mobile touchscreen). The GUI (202) may be an Internet application hosted on the joining module computing system (152) and presented on the client computing system (194).

The GUI (202) presents, in part, worksheets to a user. A worksheet is a presentation of a data set, such as a table, from a database (206). The GUI presents a worksheet using the information in the worksheet metadata. Worksheet metadata is data that describes a worksheet. Specifically, the worksheet metadata may include a description of the data set, the formulas to be applied to the data set, and the presentation structure of the data set. The description of the data set describes which data is to be requested via the database query. The description of the data set may include which columns and rows of data are to be retrieved from the database (206) via the database query. The formulas to be applied to the data set may include the manipulations of the data in the columns and rows received in the data set. Such manipulations may include calculation columns that apply a formula to data in the data set.

The presentation structure of the data set may include presentation selections made by a user. The presentation structure may include the hierarchical relationship between the columns, filters applied to the data, and the manner in which the data is sorted. The presentation structure of the data set may also include the GUI visibility of particular data within the data set. GUI visibility may be altered based on filter settings of the data or on the visibility status (e.g., hidden or not hidden) of a column within the data set. The presentation structure of the data set may also include the formatting of the worksheet, such as the size of rows and columns.

The joining module (126) is hardware, software, or an aggregation of hardware and software configured to receive a request to join, to a first worksheet, a second worksheet from the database; for each row in the first worksheet: generate a join row for data from the second worksheet on the database; in response to determining that there is at least one matching row in the second worksheet on the database: compare a maximum value and a minimum value for each column in each row of the at least one matching row; if the maximum value and the minimum value match, store a matching value in a corresponding column of the join row; and if the maximum value and the minimum value do not match, store a multiple value indication in the corresponding column of the join row; and present the join row adjacent to a corresponding row in the first worksheet. The joining module (126) may be part of a database query generator that generates a database query.

The local storage (204) is a repository used to store data such as join rows and worksheet metadata. The database (206) is a collection of data and a management system for the data. The management system may receive database queries, such as structure query language (SQL) queries, and respond to queries with a data set.

Figure 3:
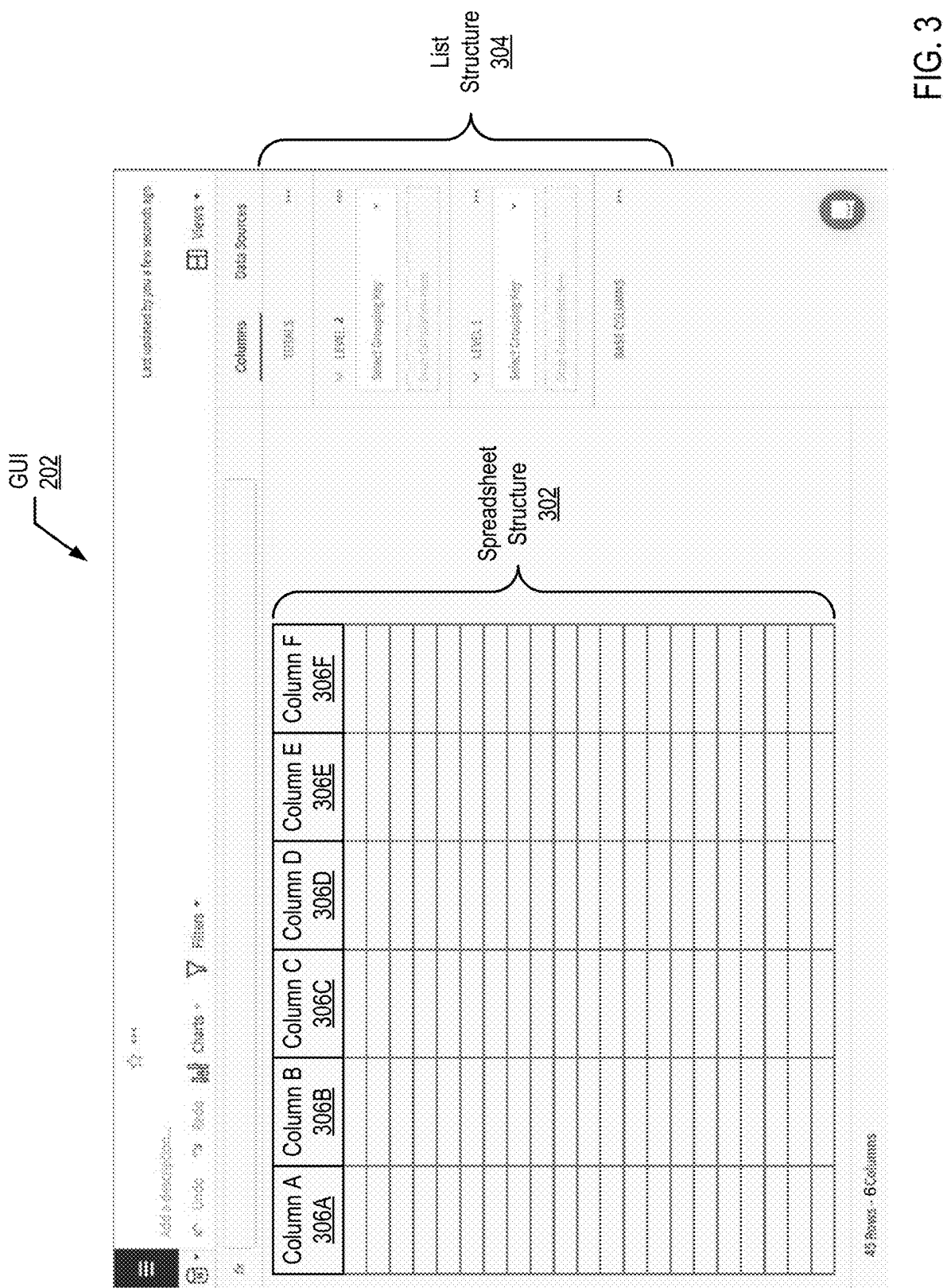
FIG. 3 sets forth a block diagram of an example system configured for maintaining cardinality of rows while joining worksheets from a database according to embodiments of the present invention.

FIG. 3 shows an exemplary graphical user interface (GUI) for maintaining cardinality of rows while joining worksheets from a database according to embodiments of the present invention. As shown in FIG. 3, the exemplary GUI (202) includes a spreadsheet structure (302) and a list structure (304). The spreadsheet structure (302) includes a data set (shown as empty rows) with six columns (column A (306A), column B (306B), column C (306C), column D (306D), column E (306E), column F (306F)).

The spreadsheet structure (302) is a graphical element and organizing mechanism for the data set. The spreadsheet structure (302) displays the data within the data set as rows of data organized by columns (column A (306A), column B (306B), column C (306C), column D (306D), column E (306E), column F (306F)). The columns delineate different categories of the data in each row of the data set. The columns may also be calculations using other columns in the data set.

The list structure (304) is a graphical element used to define and organize the hierarchical relationships between the columns (column A (306A), column B (306B), column C (306C), column D (306D), column E (306E), column F (306F)) of the data set. The term "hierarchical relationship" refers to subordinate and superior groupings of columns. For example, a database may include rows for an address book, and columns for state, county, city, and street. A data set from the database may be grouped first by state, then by county, and then by city. Accordingly, the state column would be at the highest level in the hierarchical relationship, the county column would be in the second level in the hierarchical relationship, and the city column would be at the lowest level in the hierarchical relationship.

The list structure (304) presents a dimensional hierarchy to the user. Specifically, the list structure (304) presents levels arranged hierarchically across at least one dimension. Each level within the list structure (304) is a position within a hierarchical relationship between columns (column A (306A), column B (306B), column C (306C), column D (306D), column E (306E), column F (306F)). The keys within the list structure (304) identify the one or more columns that are the participants in the hierarchical relationship. Each level may have more than one key.

One of the levels in the list structure (304) may be a base level. Columns selected for the base level provide data at the finest granularity. One of the levels in the list structure (304) may be a totals or root level. Columns selected for the totals level provide data at the highest granular level. For example, the totals level may include a field that calculates the sum of each row within a single column of the entire data set (i.e., not partitioned by any other column).

The GUI (202) may enable a user to drag and drop columns (column A (306A), column B (306B), column C (306C), column D (306D), column E (306E), column F (306F)) into the list structure (304). The order of the list structure (304) may specify the hierarchy of the columns relative to one another. A user may be able to drag and drop the columns in the list structure (304) at any time to redefine the hierarchical relationship between columns. The hierarchical relationship defined using the columns selected as keys in the list structure (304) may be utilized in charts such that drilling down (e.g., double click on a bar), enables a new chart to be generated based on a level lower in the hierarchy.

Figure 4:
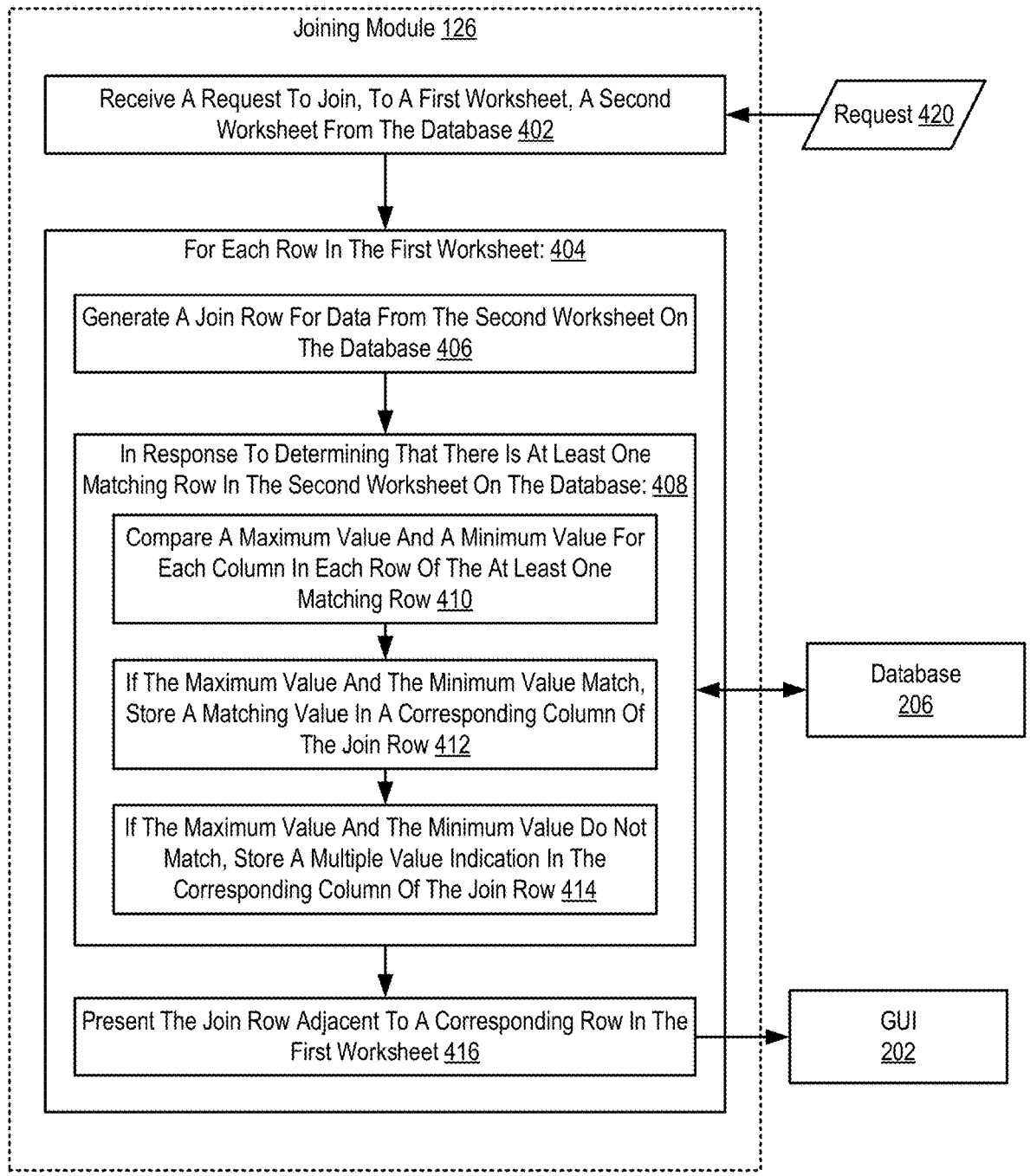
FIG. 4 sets forth a flow chart illustrating an exemplary method for maintaining cardinality of rows while joining worksheets from a database according to embodiments of the present invention.

For further explanation, FIG. 4 sets forth a flow chart illustrating an exemplary method for maintaining cardinality of rows while joining worksheets from a database according to embodiments of the present invention that includes receiving (402) a request (420) to join, to a first worksheet, a second worksheet from the database (206). Receiving (402) a request (420) to join, to a first worksheet, a second worksheet from the database (206) may be carried out by the joining module (126) receiving, via the GUI (202), the request (420) referencing the first worksheet and the second worksheet and an instruction to join the worksheets together. The request may include information about the first worksheet and the second worksheet, such as a reference to a table or other data set on the database (206) and description of rows and columns in the table or data set to include.

The request may further include a join key or foreign key. A join key is a link between one row in a first column (i.e., a value) and another row in a second column or group of columns. A join key may be set using matching values from two columns in different tables or may be set by associating values in one column in one table with different values in another column in a different table. The manner in which a join key connects two columns of data is referred to as the join pattern. A join key may include multiple links between values and rows. The data source worksheet joining the two tables may exclude from presentation any columns in either table, including the column that includes a value selected for the join key, without altering the join key.

A join key differs from a foreign key used in databases to create relationships between tables. Specifically, while a foreign key is defined within a database (206) to create a relationship between two tables, a join key is defined outside of the database (206) (e.g., on the joining module computing system (152)). Join keys can create relationships between tables not contemplated by the database, and can be implemented in join patterns not contemplated by the database.

For example, consider the following two tables:

TABLE 1

| Customer Name | Customer ID |
|---|---|
| Aaron Anderson | 101 |
| Bonnie Burke | 102 |
| Carl Cavender | 103 |
| Donny Deacon | 104 |
| Edward Ellis | 105 |

TABLE 2

| Customer ID | Order ID | Item Category | Item Ordered | Quantity Ordered |
|---|---|---|---|---|
| 101 | X87 | Widgets | Widget A | 5 |
| 103 | X02 | Cogs | Cog C | 10 |
| 103 | X65 | Cogs | Cog C | 10 |
| 103 | X10 | Cogs | Cog C | 10 |
| 104 | X77 | Tools | Tool F | 1 |
| 104 | X77 | [NULL] | Device A | 1 |
| 105 | X92 | [NULL] | Device A | 5 |
| 106 | X35 | Widgets | Widget B | 7 |

Table 1 and Table 2 show worksheet presentation of data from tables on the database (206). The joining module (126) may receive a reference to Table 1 and a reference to Table 2 as part of the request (420). The references may be to a table or data set on the database. The request (420) may also identify the customer ID column as the join key or foreign key.

The method of FIG. 4 further includes for each row in the first worksheet (404): generating (406) a join row for data from the second worksheet on the database (206). Generating (406) a join row for data from the second worksheet on the database (206) may be carried out by the joining module (126) creating an empty data structure used by the joining module (126) to store data for the join row prior to presentation within the GUI (202). A join row is a row, corresponding to a row in the first worksheet, that stores data from columns in the second worksheet.

The method of FIG. 4 further includes determining (408) that there is at least one matching row in the second worksheet on the database (206). Determining (408) that there is at least one matching row in the second worksheet on the database (206) may be carried out by the joining module (126) querying the database (206) to determine whether a row (e.g., linked by a join key or foreign key) exists that corresponds to the row in the first worksheet.

The method of FIG. 4 further includes comparing (410) a maximum value and a minimum value for each column in each row of the at least one matching row. Comparing (410) a maximum value and a minimum value for each column in each row of the at least one matching row may be carried out by the joining module (126) calculating the maximum and minimum value for a column for each matching row. Calculating the maximum and minimum value for a column for each matching row may include iterating through each row in the column and comparing the value to the currently stored minimum or maximum. If the new value exceeds the current maximum, or falls below the current minimum, that value is stored as the new maximum or minimum value. The process then proceeds to the next row in the column. A null value may be assigned a value, such as an extreme equivalent value (e.g., the maximum possible value or the minimum possible value). Once the entire column has been iterated through, the maximum value and minimum values are compared.

Calculating the maximum and minimum value for a column for each matching row avoids costly operations on the database, such as sorting the rows in a table. Although other mechanisms exist for determining whether a column includes unique values, most may be inefficient database operations.

The method of FIG. 4 further includes, if the maximum value and the minimum value match, storing (412) a matching value in a corresponding column of the join row. Determining that the maximum value and the minimum value match may be carried out by the joining module (126) comparing the maximum value and the minimum value and determining that the two values are equivalent. Determining that the two values are equivalent may include determining that the two values are identical. Determining that the two values are equivalent may alternatively include the use of a matching policy, such as determining that the difference between the values are within a threshold tolerance. For example, decimal points may be ignored during the comparison of the maximum value and the minimum value.

Storing (412) a matching value in a corresponding column of the join row may be carried out by placing a value that is identical to both values in the corresponding column of the join row. Alternatively, storing (412) a matching value in a corresponding column of the join row may be carried out by placing a value that matches the maximum value and the minimum value based on the matching policy. The matching value may be equal to the maximum value, the minimum value, or a value based on the matching policy. For example, if the maximum value is 2.2 and the minimum value is 2.1, the stored matching value may be 2.

The method of FIG. 4 further includes, if the maximum value and the minimum value do not match, storing (414) a multiple value indication in the corresponding column of the join row. Determining that the maximum value and the minimum value do not match may be carried out by the joining module (126) comparing the maximum value and the minimum value and determining that the two values are not equivalent. Determining that the two values are equivalent may include determining that the two values are not identical. Determining that the two values are not equivalent may alternatively include the use of the matching policy, such as determining that the difference between the values are outside a threshold tolerance.

At least one of the maximum value and the minimum value for at least one column may include a null value. Null values may be accounted for in determining the maximum and minimum values. Specifically, a column that includes at least one null value and at least one non-null value may not result in a determination that the maximum value and the minimum value match or a matching value being placed in the corresponding column of the join row.

Storing (414) a multiple value indication in the corresponding column of the join row may be carried out by the joining module (126) placing an indication that a column includes more than one value in the corresponding column of the join row. A multiple value indication is an element, value, or symbol that expresses to a user that a column for the matching rows includes more than one value (or values that differ beyond a threshold). The multiple value indication may communicate the number of different values in the corresponding column. For example, the multiple value indication may be "<<4>>" to indicate four different values in the column.

The multiple value indication may further include a mechanism to access a list of each unique value in the corresponding column. Storing (414) a multiple value indication in the corresponding column of the join row may be carried out by retrieving each unique value in the corresponding column from the database and storing each unique value locally. A link to the list of unique values may then be stored in the corresponding column of the join row such that a user that activates the link is presented with the list of unique values. The list may also include the number of occurrences of each value.

The steps described above, such as steps 408, 410, 412, and 414, may include generating SQL queries to retrieve and manipulate data on the database (206). For example, an SQL query may be generated to query a column, limited by a set of matching rows, for the minimum value and the maximum value in the column.

The method of FIG. 4 further includes presenting (416) the join row adjacent to a corresponding row in the first worksheet. Presenting (416) the join row adjacent to a corresponding row in the first worksheet may be carried out by the joining module (126) placing the values in the join row next to the corresponding row in the first worksheet.

TABLE 3

| Customer Name | Customer ID | Order ID | Item Category | Item Ordered | Quantity Ordered |
|---|---|---|---|---|---|
| Aaron Anderson | 101 | X87 | Widgets | Widget A | 5 |
| Bonnie Burke | 102 | [NULL] | [NULL] | [NULL] | [NULL] |
| Carl Cavender | 103 | @ | Cogs | Cog C | 10 |
| Donny Deacon | 104 | X77 | @ | @ | 1 |
| Edward Ellis | 105 | X92 | [NULL] | Device A | 5 |

Table 3 shows an example of the resulting joined worksheet using the steps described above. Assume that a user has requested that the worksheet shown in Table 1 be joined with the worksheet shown in Table 2 using the customer ID as a join key. Beginning with the Customer ID 101, the joining module (126) determines that the maximum value and minimum value for each column and compares the values. Because there is only one matching row in Table 2, each maximum value and minimum value match, and those values are placed in the corresponding column.

Continuing with Customer ID 102, the joining module (126) determines that there is no matching row in the second worksheet. Therefore, a null value is placed in each column of the join row. Continuing with Customer ID 103, the joining module (126) determines that there are three matching rows in the second worksheet. For the Order ID column, the maximum value ("X65") does not match the minimum value ("X02"), and a multiple value indication ("@") is placed in the corresponding column. For the Item Category column, the maximum value ("Cogs") matches the minimum value ("Cogs"), and therefore a matching value ("Cogs") is placed in the corresponding column. For the Item Ordered column, the maximum value ("Cog C") matches the minimum value ("Cog C"), and therefore a matching value ("Cog C") is placed in the corresponding column. For the Quantity Ordered column, the maximum value ("10") matches the minimum value ("10"), and therefore a matching value ("10") is placed in the corresponding column.

Continuing with Customer ID 104, the joining module (126) determines that there are two matching rows in the second worksheet. For the Order ID column, the maximum value ("X77") matches the minimum value ("X77"), and therefore a matching value ("X77") is placed in the corresponding column. For the Item Category column, the maximum value ("Tools") does not match the minimum value ("Null"), and a multiple value indication ("@") is placed in the corresponding column. For the Item Ordered column, the maximum value ("Tool F") does not match the minimum value ("Device A"), and a multiple value indication ("@") is placed in the corresponding column. For the Quantity Ordered column, the maximum value ("1") matches the minimum value ("1"), and therefore a matching value ("1") is placed in the corresponding column.

Finally, for Customer ID 105, the joining module (126) determines that there is only one matching row in Table 2, each maximum value and minimum value match (including the null value), and those value are placed in the corresponding column. Note that no data from the row for Customer ID 106 is added to the first worksheet because the first worksheet does not include a row for Customer ID 106.

The above limitations improve the operation of the computer system by maintaining the cardinality of rows when joining two worksheets together. Specifically, the above steps provide a mechanism by which a user may join one worksheet to another without changing the number of rows in that worksheet. This process prevents disruption to calculations and formulas in the first worksheet that assume a particular number of rows in the worksheet.

Figure 5:
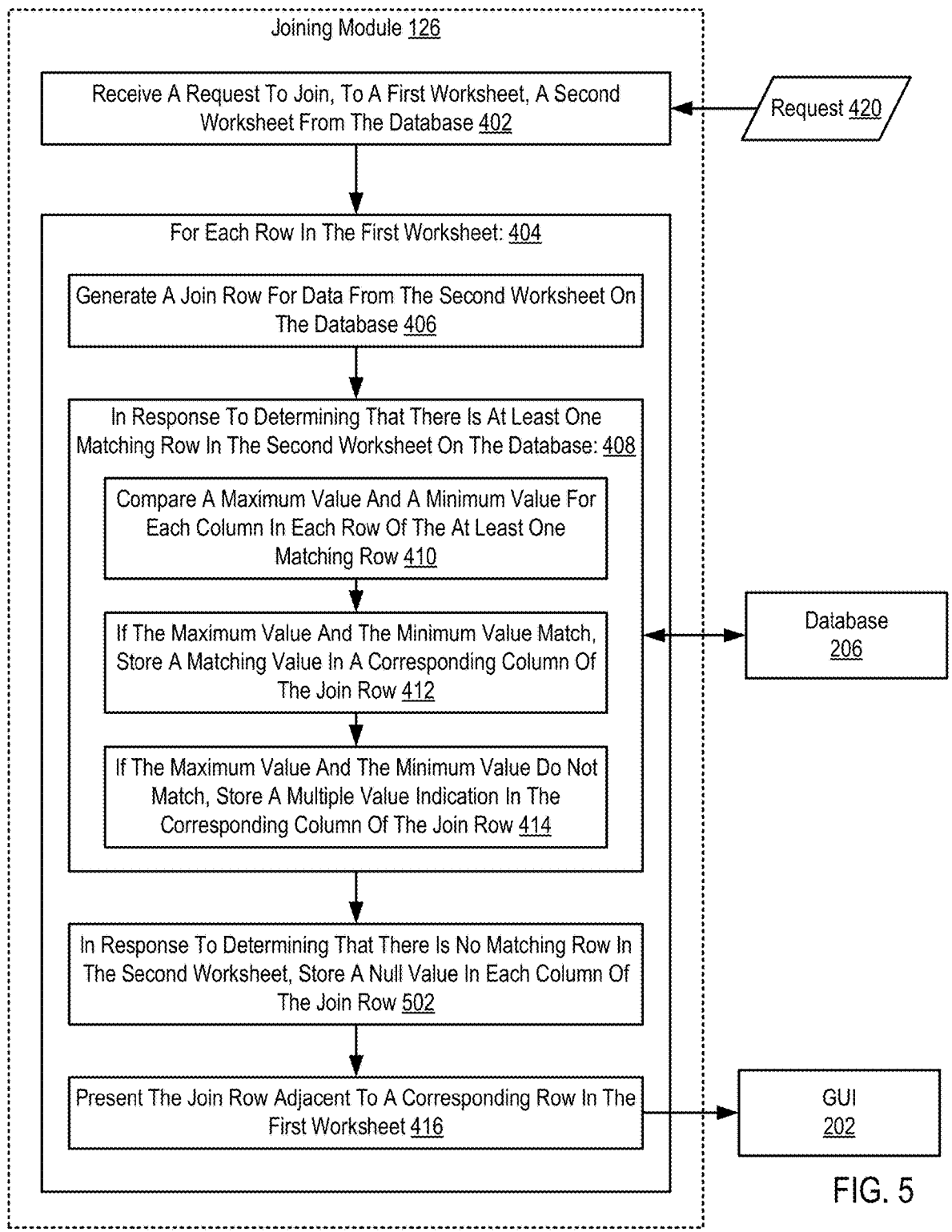
FIG. 5 sets forth a flow chart illustrating an exemplary method for maintaining cardinality of rows while joining worksheets from a database according to embodiments of the present invention.

For further explanation, FIG. 5 sets forth a flow chart illustrating a further exemplary method for maintaining cardinality of rows while joining worksheets from a database according to embodiments of the present invention that includes receiving (402) a request (420) to join, to a first worksheet, a second worksheet from the database (206); for each row in the first worksheet (404): generating (406) a join row for data from the second worksheet on the database (206); in response to determining (408) that there is at least one matching row in the second worksheet on the database (206): comparing (410) a maximum value and a minimum value for each column in each row of the at least one matching row; if the maximum value and the minimum value match, storing (412) a matching value in a corresponding column of the join row; and if the maximum value and the minimum value do not match, storing (414) a multiple value indication in the corresponding column of the join row; and presenting (416) the join row adjacent to a corresponding row in the first worksheet.

The method of FIG. 5 differs from the method of FIG. 4, however, in that the method of FIG. 5 further includes, in response to determining that there is no matching row in the second worksheet, storing (502) a null value in each column of the join row. Determining that there is no matching row in the second worksheet may be carried out by the joining module (126) querying the second worksheet (or data on the database that makes up the second worksheet) for a row matching the join key or foreign key and receiving an indication that no such row exists. Storing (502) a null value in each column of the join row may be carried out by the joining module (126) placing a null value or null indicator (e.g., "Null", a blank, etc.) in each corresponding column of the join row.

Figure 6:
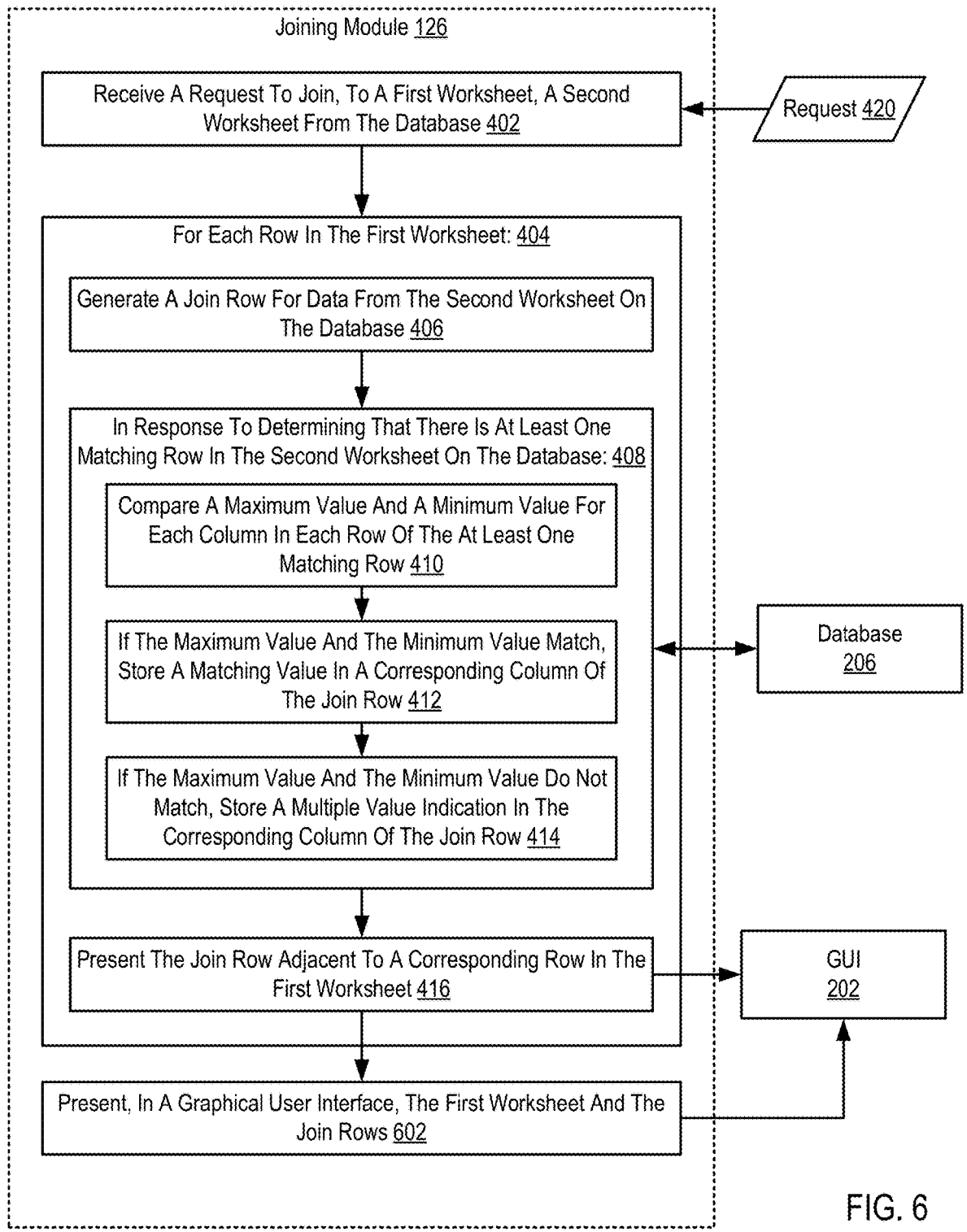
FIG. 6 sets forth a flow chart illustrating an exemplary method for maintaining cardinality of rows while joining worksheets from a database according to embodiments of the present invention.

For further explanation, FIG. 6 sets forth a flow chart illustrating a further exemplary method for maintaining cardinality of rows while joining worksheets from a database according to embodiments of the present invention that includes receiving (402) a request (420) to join, to a first worksheet, a second worksheet from the database (206); for each row in the first worksheet (404): generating (406) a join row for data from the second worksheet on the database (206); in response to determining (408) that there is at least one matching row in the second worksheet on the database (206): comparing (410) a maximum value and a minimum value for each column in each row of the at least one matching row; if the maximum value and the minimum value match, storing (412) a matching value in a corresponding column of the join row; and if the maximum value and the minimum value do not match, storing (414) a multiple value indication in the corresponding column of the join row; and presenting (416) the join row adjacent to a corresponding row in the first worksheet.

The method of FIG. 6 differs from the method of FIG. 4, however, in that the method of FIG. 6 further includes presenting (602), in a graphical user interface (202), the first worksheet and the join rows. Presenting (602), in a graphical user interface (202), the first worksheet and the join rows may be carried out by the joining module (126) sending, to the GUI (202) the join rows and the first worksheet as a table for presentation to the user.

In view of the explanations set forth above, readers will recognize that the benefits of maintaining cardinality of rows while joining worksheets from a database according to embodiments of the present invention include:

Improving the operation of a computing system by maintaining the cardinality of rows when joining two worksheets together, increasing computing system functionality and efficiency.

Improving the operation of a computing system by providing a SQL translation layer between user worksheets and a database, increasing computing system functionality and usability.

Exemplary embodiments of the present invention are described largely in the context of a fully functional computer system for maintaining cardinality of rows while joining worksheets from a database. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of maintaining cardinality of rows while joining worksheets from a database, the method comprising:
   receiving a request to join, to a first worksheet, a second worksheet from the database;
   for each row in the first worksheet:
      generating a join row for data from the second worksheet on the database;
      in response to determining that there is at least one matching row in the second worksheet on the database:
         compare a maximum value and a minimum value for each column in each row of the at least one matching row;
         if the maximum value and the minimum value match, store a matching value in a corresponding column of the join row; and
         if the maximum value and the minimum value do not match, store a multiple value indication in the corresponding column of the join row, wherein the multiple value indication comprises a mechanism to access a list of each unique value in the corresponding column, and wherein storing the multiple value indication in the corresponding column of the join row comprises retrieving each unique value in the corresponding column from the database and storing each unique value locally; and
   presenting the join row adjacent to a corresponding row in the first worksheet.

2. The method of claim 1, further comprising:
   in response to determining that there is no matching row in the second worksheet, store a null value in each column of the join row.

3. The method of claim 1, further comprising:
   presenting, in a graphical user interface, the first worksheet and the join rows.

4. The method of claim 1, wherein at least one of the maximum value and the minimum value for at least one column comprises a null value.

5. The method of claim 1, wherein the multiple value indication communicates a number of different values in the corresponding column.

6. An apparatus for maintaining cardinality of rows while joining worksheets from a database, the apparatus comprising a computer processor, a computer memory operatively coupled to the computer processor, the computer memory having disposed within it computer program instructions that, when executed by the computer processor, cause the apparatus to carry out the steps of:
   receiving a request to join, to a first worksheet, a second worksheet from the database;
   for each row in the first worksheet:
      generating a join row for data from the second worksheet on the database;
      in response to determining that there is at least one matching row in the second worksheet on the database:
         compare a maximum value and a minimum value for each column in each row of the at least one matching row;
         if the maximum value and the minimum value match, store a matching value in a corresponding column of the join row; and
         if the maximum value and the minimum value do not match, store a multiple value indication in the corresponding column of the join row, wherein the multiple value indication comprises a mechanism to access a list of each unique value in the corresponding column, and wherein storing the multiple value indication in the corresponding column of the join row comprises retrieving each unique value in the corresponding column from the database and storing each unique value locally; and
   presenting the join row adjacent to a corresponding row in the first worksheet.

7. The apparatus of claim 6, wherein the computer program instructions further cause the apparatus to carry out the steps of:
   in response to determining that there is no matching row in the second worksheet, store a null value in each column of the join row.

8. The apparatus of claim 6, wherein the computer program instructions further cause the apparatus to carry out the steps of:
   presenting, in a graphical user interface, the first worksheet and the join rows.

9. The apparatus of claim 6, wherein at least one of the maximum value and the minimum value for at least one column comprises a null value.

10. The apparatus of claim 6, wherein the multiple value indication communicates a number of different values in the corresponding column.

11. A computer program product for maintaining cardinality of rows while joining worksheets from a database, the computer program product disposed upon a computer readable medium, the computer program product comprising computer program instructions that, when executed, cause a computer to carry out the steps of:
   receiving a request to join, to a first worksheet, a second worksheet from the database;
   for each row in the first worksheet:
      generating a join row for data from the second worksheet on the database;
      in response to determining that there is at least one matching row in the second worksheet on the database:
         compare a maximum value and a minimum value for each column in each row of the at least one matching row;
         if the maximum value and the minimum value match, store a matching value in a corresponding column of the join row; and
         if the maximum value and the minimum value do not match, store a multiple value indication in the corresponding column of the join row, wherein the multiple value indication comprises a mechanism to access a list of each unique value in the corresponding column, and wherein storing the multiple value indication in the corresponding column of the join row comprises retrieving each unique value in the corresponding column from the database and storing each unique value locally; and
   presenting the join row adjacent to a corresponding row in the first worksheet.

12. The computer program product of claim 11, wherein the computer program instructions further cause the computer to carry out the steps of:
   in response to determining that there is no matching row in the second worksheet, store a null value in each column of the join row.

13. The computer program product of claim 11, wherein the computer program instructions further cause the computer to carry out the steps of:

presenting, in a graphical user interface, the first worksheet and the join rows.

14. The computer program product of claim 11, wherein at least one of the maximum value and the minimum value for at least one column comprises a null value.

\* \* \* \* \*